United States Patent
Peroulakis

(10) Patent No.: US 6,682,016 B1
(45) Date of Patent: Jan. 27, 2004

(54) THERMAL MANAGEMENT VALVE WITH DROP-TIGHT SHUTOFF OF RETURN TO TANK

(75) Inventor: George Peroulakis, Rocky Hill, CT (US)

(73) Assignee: Hamilton Sundstrand, Windsor Locks, CT (US)

( * ) Notice: Subject to any disclaimer, the term of this patent is extended or adjusted under 35 U.S.C. 154(b) by 0 days.

(21) Appl. No.: 10/235,287

(22) Filed: Sep. 5, 2002

(51) Int. Cl.$^7$ .............................................. B64D 37/36
(52) U.S. Cl. ...................... 244/57; 244/135 R; 60/73 C
(58) Field of Search ................................ 244/57, 76 R, 244/135 R, 53 R; 60/736, 734, 39, 141, 39.08, 741

(56) References Cited

U.S. PATENT DOCUMENTS

| | | | | |
|---|---|---|---|---|
| 3,779,007 A | * | 12/1973 | Lavash ..................... | 60/39.281 |
| 4,705,100 A | * | 11/1987 | Black et al. .................. | 165/40 |
| 4,899,535 A | * | 2/1990 | Dehan et al. .............. | 60/39.08 |
| 5,152,146 A | * | 10/1992 | Butler ........................ | 60/736 |
| 5,177,951 A | * | 1/1993 | Butler ........................ | 60/39.02 |
| 6,415,595 B1 | * | 7/2002 | Wilmot, Jr. et al. .......... | 60/736 |

* cited by examiner

Primary Examiner—Galen L. Barefoot
(74) Attorney, Agent, or Firm—Carlson, Gaskey & Olds

(57) ABSTRACT

A thermal management system for an aircraft fuel system includes a plurality of fuel pressure sources. A spool valve is fluidly connected to the pressure sources and is movable between a plurality of positions in response to the pressure sources. An oil cooler is fluidly connected to the spool valve with fuel flowing through the spool valve to the oil cooler in response to the spool valve being in one of the positions. The fuel tank is fluidly connected to the spool valve with fuel flowing to the spool valve to the fuel tank in response to the spool valve being in another of the positions. The spool valve moves to a closed fuel tank output position response to the pressure sources. The spool valve includes a housing having a bore with the plurality of pressure inputs and oil cooler and fuel tank outputs fluidly connected to the bore. A spool is disposed within the bore and is movable axially relative thereto between oil cooler, open fuel tank and the closed fuel tank outward positions. A valve assembly including a piston and target piston is disposed within the bore and is movable axially relative thereto. The valve assembly coacts with the spool to provide the closed fuel tank output position. A seal is arranged between the spool and the valve assembly sealing the spool and the valve assembly in the closed fuel tank output position to ensure that no fuel is permitted to leak back to the fuel tank.

20 Claims, 4 Drawing Sheets

THERMAL MANAGEMENT VALVE WITH DROP-TIGHT SHUTOFF OF RETURN TO TANK

BACKGROUND OF THE INVENTION

This invention relates to a thermal management system for an aircraft fuel system, and more particularly, the invention relates to a spool valve for the thermal management system that regulates the flow of fuel to the oil coolers and fuel tank for maintaining a desired temperature of fuel within the system.

The fuel systems of gas turbine engines typically include a return to tank function in which fuel is recirculated back to the main fuel tank using it as a heat sink to dissipate excess heat within the fuel system. Maintaining the fuel within the aircraft fuel system within a particular temperature range is necessary for desired operation of the components and overall aircraft engine and fuel system integrity. Fuel tank materials are sensitive to excessively hot fuel. Accordingly, the return to tank function must be capable of being shut completely off with no leakage. The slightest amount of leakage to the fuel tank could be detrimental. The prior art has utilized a separate, stand-alone shutoff valve to shut the flow of fuel off during the return to tank function. It is a relatively simple task to ensure that no fuel flows to the tank with a standalone valve. Numerous other valves within the fuel system are used to regulate the flow and pressure of the fuel to various components.

There is an effort to simplify aircraft systems, like many other systems in industry, to reduce components and cost. Therefore, it is desirable to simplify the aircraft fuel system and reduce the number of valves and components if at all possible. However, the need for providing a shutoff valve to the fuel tank that ensures that no leakage will occur is difficult to integrate with other valves. To this end, what is needed is an integrated shutoff valve providing a simplified thermal management system for an aircraft fuel system.

SUMMARY OF THE INVENTION AND ADVANTAGES

The present invention provides a thermal management system for an aircraft fuel system including a plurality of fuel pressure sources. A spool valve is fluidly connected to the pressure sources and is movable between a plurality of positions in response to the pressure sources. An oil cooler is fluidly connected to the spool valve with fuel flowing through the spool valve to the oil cooler in response to the spool valve being in one of the positions. The fuel tank is fluidly connected to the spool valve with fuel flowing to the spool valve to the fuel tank in response to the spool valve being in another of the positions. The spool valve moves to a closed fuel tank output position response to the pressure sources. The spool valve includes a housing having a bore with the plurality of pressure inputs and oil cooler and fuel tank outputs fluidly connected to the bore. A spool is disposed within the bore and is movable axially relative thereto between oil cooler, open fuel tank and the closed fuel tank outward positions. A valve assembly including a piston and target piston is disposed within the bore and is movable axially relative thereto. The valve assembly coacts with the spool to provide the closed fuel tank output position. A seal is arranged between the spool and the valve assembly sealing the spool and the valve assembly in the closed fuel tank output position to ensure that no fuel is permitted to leak back to the fuel tank.

Accordingly, the above invention provides a simplified aircraft fuel system with an integrated fuel tank shutoff valve.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
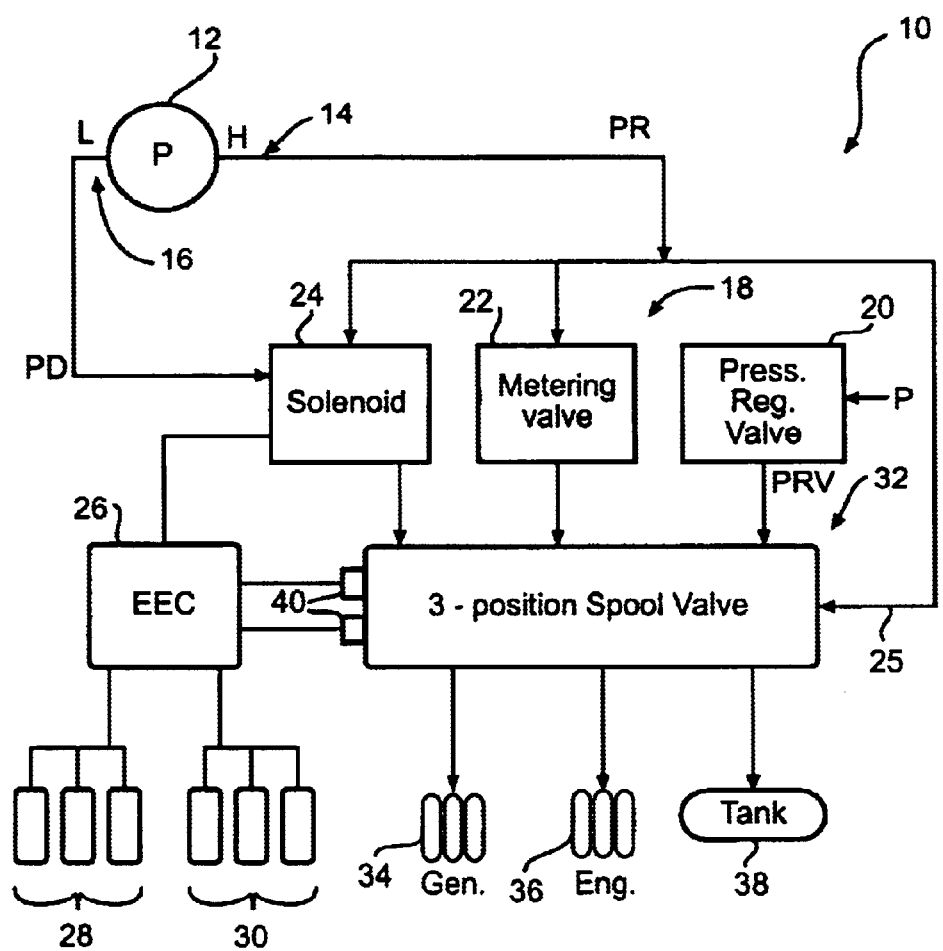
FIG. 1 is a schematic view of the present invention thermal management system for an aircraft fuel system.

A thermal management system 10 for an aircraft fuel system is shown in FIG. 1. The system 10 is shown schematically and typically contains many other valves and fluid connections. Also, it is to be understood that the fluid pressure sources and components shown may be arranged in a different configuration or changed and remain within the scope of the present invention.

The system 10 includes a pump 12 having a high-pressure side 14 and a low-pressure side 16. PR is indicative of supply pressure from the pump 12. PD is return or drain pressure from the pump 12. The system 10 includes a plurality of fuel pressure sources 18 that may include, among other components, a pressure regulator valve 20, a metering valve 22, and a solenoid 24. The pressure regulator valve 20 receives fuel pressure from a source P, which may or may not be at supply pressure from the pump 12. The fuel flowing out of the pressure regulator valve 20 is at a regulated pressure PDV. The metering valve 22 selectively supplies fuel at the supply pressure PR. That is, the metering valve 22 either provides fuel at the supply pressure or supplies no fuel. The solenoid 24 is connected to an engine electronic controller 26. The solenoid 24 selectively supplies either supply pressure or drain pressure fuel in response to a signal from the controller 26.

A plurality of temperature 28 and fuel flow 30 sensors are connected to the electronic controller 26 and arranged about the system 10 to monitor the temperature of the fuel and the fuel flow rate in various locations to maintain desired operation of the system 10. In particular, the sensors 28 and 30 ensure that high temperature conditions that may arise will not damage the fuel tank 38. Excessively high temperatures negatively affect the tank 38.

The pressure sources 18 also include an input 25 at an end of a spool valve 32. The spool valve 32 receives the fuel from the fuel pressure sources 18 and controls the flow of fuel to the various components under the direction of the controller 46. The spool valve 32 has oil cooler outputs connected to a generator cooler 34 and an engine oil cooler 36. Fuel is sent to the oil coolers to lower the temperature of the fuel until it reaches a desirable level. As discussed above, the fuel tank 38 is also used as a cooler to help cool the fuel. However, at excessively high temperatures the tank 38 can no longer be used to cool the fuel and the oil coolers 34 and 36 may only be used.

The spool valve 32 may include valve position sensors 40 that are connected to the electronic controller 26 to monitor the position of the valve 32, which corresponds to the flow of fuel to the oil coolers 34, 36 and the fuel tank 38. Preferably, at least two sensors 40 are used to provide redundancy in the system to ensure accurate determination of the position of the spool valve 32. The spool valve 32 provides a position in which fuel flow to the tank 38 is completely shutoff so that excessively high temperature fuel does not degrade the tank 38. That is, the system 10 must ensure that fuel may not be permitted to leak past the spool valve 32 into the tank 38. The valve position sensors 40 ensure that the spool valve 32 is in the closed fuel tank output position when desired, otherwise, a fault is sent to the aircraft operator to warn the operator of improper operation of the system 10.

Figure 2:
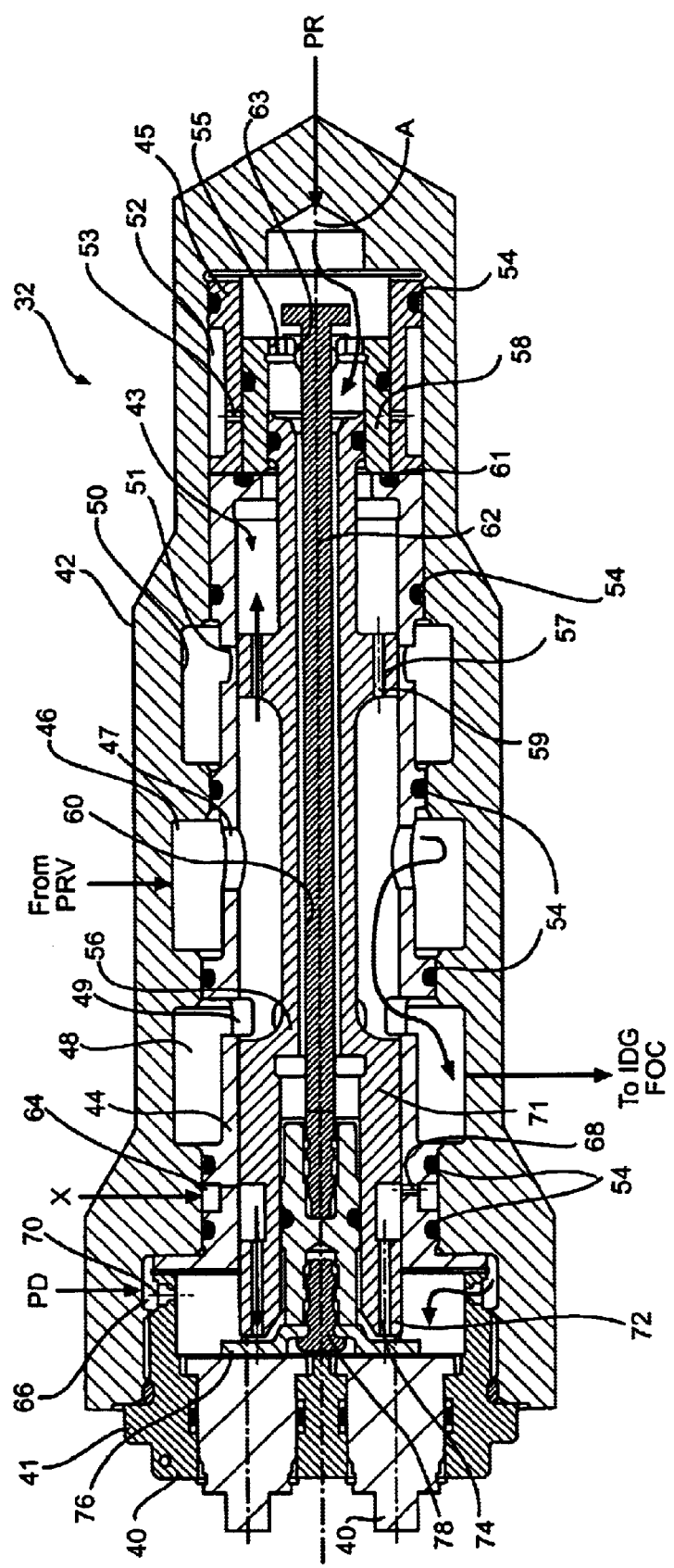
FIG. 2 is a cross-sectional view of the spool valve shown in FIG. 1 in an open generator oil cooler position.

Referring to FIG. 2, the spool valve 32 includes a housing 42. The housing 42 together with a spool sleeve 44 and piston sleeve 45, which is arranged adjacent to the spool sleeve 44, form a bore 43. A cap 41 is fastened to the open end of the housing 42 to seal the spool valve 32 and axially locate the sleeves 44 and 45 securely within the housing 42. The cap 41 supports the valve position sensors 40.

The housing 42 and the sleeves 44 and 45 together form a fuel input chamber 46, a generator cooler output chamber 48, a engine cooler output chamber 50, and a fuel tank output chamber 52. Seals 61 are arranged between the sleeves 44 and 45 and the housing 42 to prevent leakage between chambers 46, 48, 50, and 52. The sleeves 44 and 45 include orifices 47, 49, 51, and 53 respectively corresponding to the chambers 46, 48, 50, and 52 to permit the flow of fuel from the given chamber to the bore 43.

A spool 56 is arranged within the spool sleeve 44 and is movable axially relative thereto along an axis A to selectively control the flow of fluid from a particular chamber to one or more of the other chambers. A valve assembly including a piston 58 may be arranged in the piston sleeve 45 adjacent to the spool 56 and coaxial therewith. The piston 58 is movable relative to the piston sleeve 45. The spool 56 includes a hole 60 with a target piston 62 arranged within the hole 60 and secured to the piston 58 at an aperture 63 in the piston so that the piston 58 and target piston 62 move axially together.

The piston 58 includes an orifice 55 in its end to permit flow of fuel from the end of the housing 42 through to the bore 43 adjacent to the end of the spool 56. The spool 56 includes an annular flange 57 with an orifice 59 permitting flow of fuel from one side of the flange 57 to the other side of the flange. A seal 61 is arranged between the sleeves 44 and 45 to provide a fuel fight seal therebetween. The seal 61 also creates a fuel tight seal between the spool sleeve 44 and the piston 58 during a closed fuel tank output position in which fuel is not permitted to flow past the piston 58 into the orifice 53 to the fuel tank output chamber 52.

A first fuel pressure chamber 64 is defined between the spool sleeve 44 and the housing 42 and receives fuel pressure from the metering valve, shown in FIG. 1. A second fuel pressure chamber 66 is defined between the cap 41 and housing 42 and receives fuel pressure from the solenoid, shown in FIG. 1. An orifice 68 in the spool sleeve 44 fluidly connects the first fuel pressure chamber 64 to the bore 43 between annular flanges 71 and 72. An orifice 74 in the flange 72 permits the flow of fuel through the flange 72. An orifice 70 in the cap 41 permits flow of fuel from the second fuel pressure chamber 66 to an area proximate to the end of the spool 56.

A target 76 is secured to an end of the spool 56 by a fastener 78. The sensors 40 detect the position of the target 76, which corresponds to the position of the piston 58. The position of the piston 58 may be related to whether the spool valve 32 is in the open or closed fuel tank output position. More than one sensor is used to ensure an accurate reading of the status of the spool valve 32 in the event of a failure of one of the sensors 40.

The positions of spool valve 56 and the piston 58 with the attached target piston 62 is determined by the various surface areas of the components 56, 58, and 62 and the fuel pressures acting on those surface areas. The surface areas of the components and the pressures to which they are subjected are designed such as to selectively open and close the cooler outputs 48 and 50 and the fuel tank output 52.

Referring to FIG. 2, the fuel input chamber 46 is subjected to a constant regulated supply pressure, and the area immediately adjacent to the piston at the end of the housing 42 is subjected to a constant unregulated supply pressure. The solenoid provides drain pressure to the second fuel pressure chamber 66, and the metering valve supplies no pressure to the first fuel pressure chamber 64. Under these pressures, the spool 56 is forced to the far right closing off the engine cooler output chamber 50 with the flange 57. The piston 58 is forced to the far right into engagement with the seal 61 preventing flow of fuel to the fuel tank output chamber 52. In this position, the target 76 of the target piston 62 is in close proximity to the sensors 40 to indicate that the spool valve 32 is in the closed fuel tank output position. However, fuel is permitted to flow from the fuel input chamber 46 to the generator output chamber 48 to cool the fuel to a desired temperature.

Figure 3:
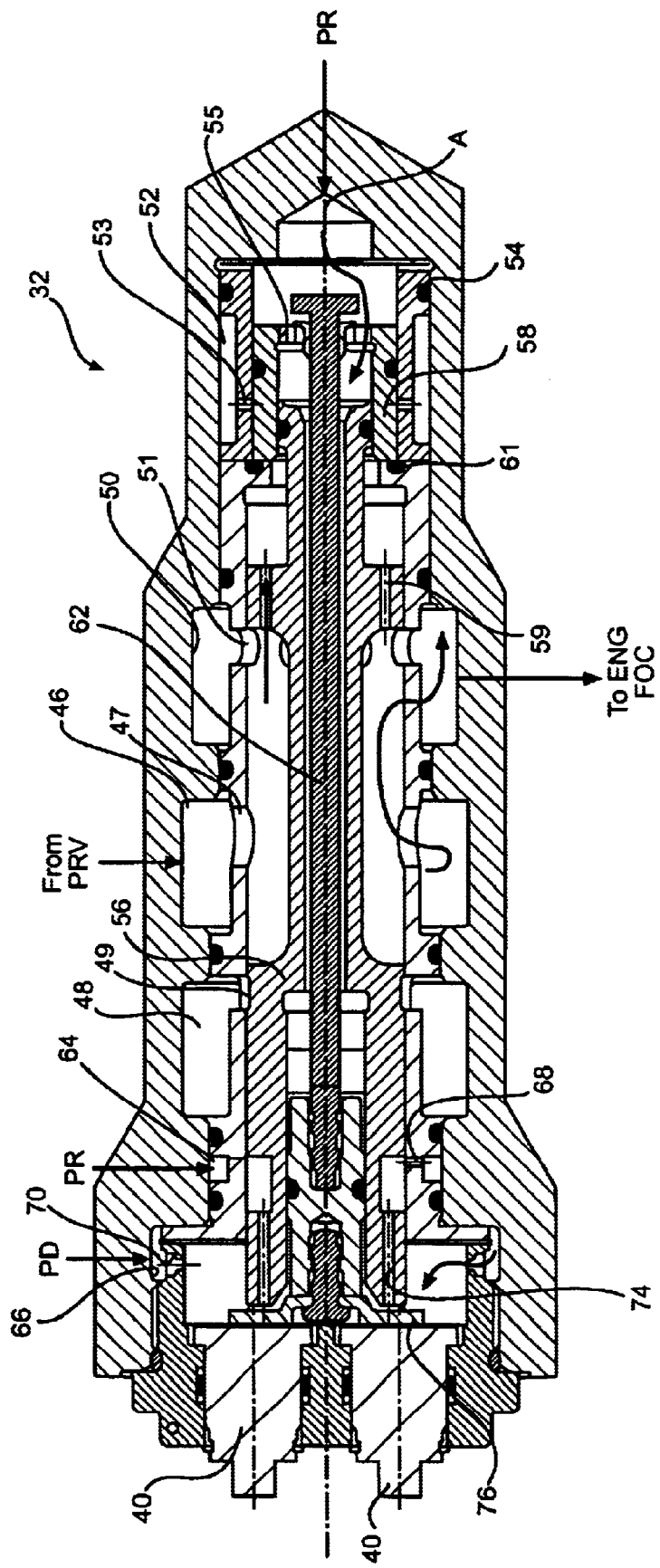
FIG. 3 is a cross-sectional view of the spool valve shown in FIG. 1 in an open engine oil cooler position.

Turning now to FIG. 3, the fuel input chamber 46, second pressure chamber 66, and the area adjacent to the piston 58 are subjected to the same pressures as descried above relative to FIG. 2. However, the metering valve provides supply pressure to the first fuel pressure chamber 64. Under these pressures, the spool 56 moves to the right relative to the spool sleeve 44 thereby blocking the flow of fuel from the fuel input chamber 56 to the generator cooler output 48 with the flange 71. However, fuel is permitted to flow from the fuel input chamber 46 to the engine cooler output chamber 50. The flow of fluid from the first fuel pressure chamber 64 past the annular flange 72 is blocked by the flange 72. The piston 58 remains in engagement with the seal 61 preventing the flow of fluid from the fuel input chamber 46 to the fuel tank output chamber 52. In this position, the target 46 remains in closed proximity to the sensors 40 indicating that the spool valve 32 is in the closed fuel tank output position.

Figure 4:
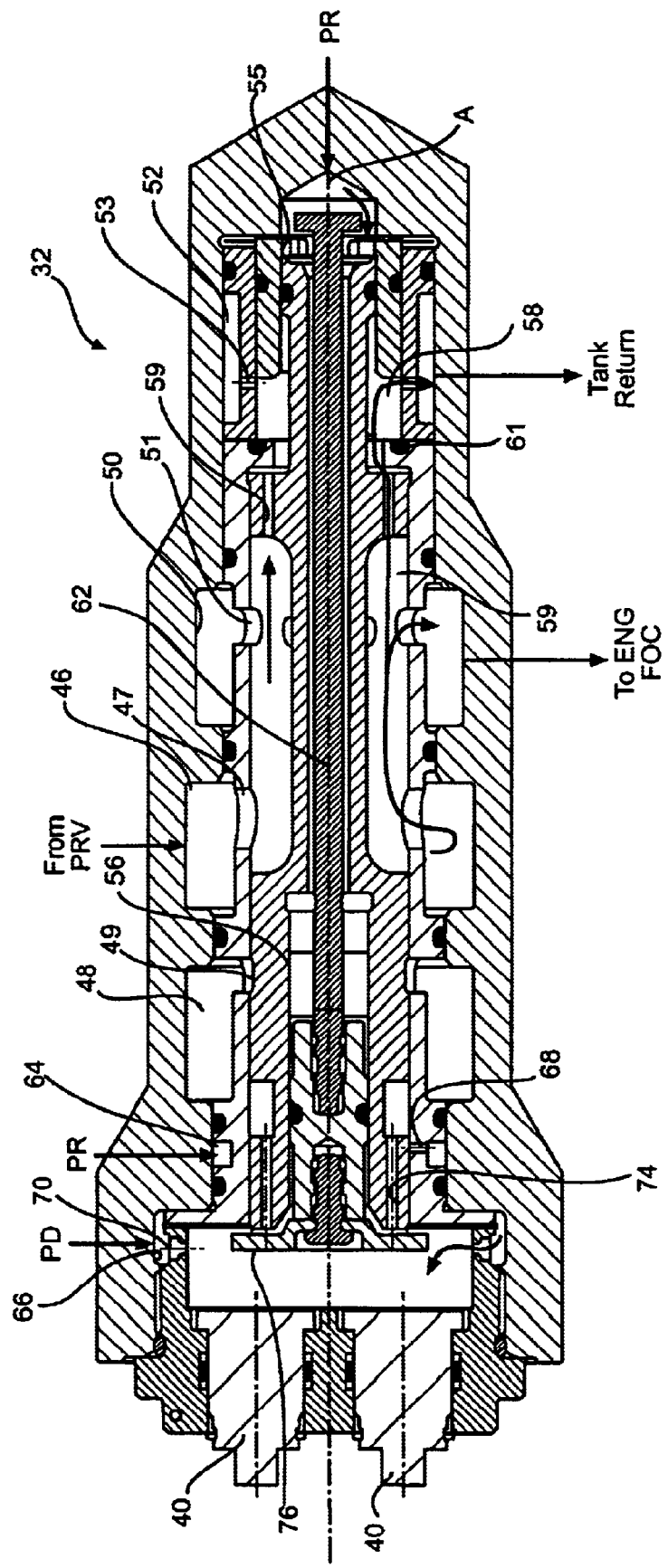
FIG. 4 is a cross-sectional view of the spool valve shown in FIG. 1 in an open engine oil cooler and open fuel tank output position.

Referring to FIG. 4, the first fuel pressure chamber 64, the fuel chamber 56, and the area proximate to the piston 58 remain under the same pressure as discussed above relative to FIG. 3. The electronic controller actuates the solenoid to provide supply pressure to the second fuel pressure chamber 66. Actuation of the solenoid by the controller to provide supply pressure to the spool valve 32 indicates that it is permissible to permit the flow of fuel to the return tank, that is, the fuel is not at an excessively high temperature. Under these pressures, the spool 56 is moved to the far right position blocking the flow of fuel from the fuel input chamber 46 to the generator cooler output chamber 48 with the flange 71. The flange 72 blocks the flow of fuel from the first fuel pressure chamber 64 to the bore 43. The spool 56 forces the piston 58 and target piston 62 to the far right position moving the target 76 away from the sensors 44. The piston 58 is moved out of engagement from the sealed 61 permitting the flow of fuel from the fuel input chamber 46 through the orifice 59 past the spool sleeve 44 through the orifice 53. The sensors 40 detect that the target 76 is spaced from the sensors and produces a signal indicative of an fuel tank output position.

The piston 58 continues to block the flow of fuel to the fuel tank output chamber 52 as the target piston 62 moves towards the right with the spool 56. However, the sensors 40 sense a open fuel tank output position prior to fuel flow to the fuel tank output chamber 52 because the piston 58 has moved out of engagement with the seal 61 permitting the possibility of fuel leakage past the piston 58 and into the fuel tank. As a precaution to ensure that no fuel leaks past the spool valve 32 to the fuel tank, the sensors 40 signal an open fuel tank output position as soon as the piston 58 disengages the seal 51.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A thermal management system for an aircraft fuel system comprising:

a plurality of fuel pressure sources;

a spool valve fluidly connected to said pressure sources and movable between a plurality of positions in response to forces generated by said pressure sources;

an oil cooler fluidly connected to said spool valve with fuel flowing through said spool valve to said oil cooler in response to said spool valve being in one of said positions; and a fuel tank fluidly connected to said spool valve with fuel flowing through said spool valve to said fuel tank in response to said spool valve being in another of said positions, and said spool valve moving to a closed fuel tank output position in response to said forces generated by said pressure sources.

2. The thermal management system according to claim 1, wherein a sensor is supported by said spool valve to sense said closed fuel tank output position based upon at least one of said plurality of positions.

3. The thermal management system according to claim 2, wherein an electronic controller is electrically connected to said sensor for receiving a signal from said sensor indicative of said closed fuel tank output position.

4. The thermal management system according to claim 2, wherein said sensor is a proximity sensor.

5. The thermal management system according to claim 3, wherein a plurality of temperature sensors and fuel flow sensors are electrically connected to said electronic controller for monitoring fuel temperature and flow in the system.

6. The thermal management system according to claim 1, wherein said spool valve includes a housing having a bore with said plurality of pressure inputs and oil cooler and fuel tank outputs fluidly connected with said bore, a spool disposed within said bore and movable axially relative thereto between open oil cooler, open fuel tank, and said closed fuel tank output positions, said positions different from one another, a valve assembly disposed within said bore and movable axially relative to said housing and said spool, said valve assembly coacting with said spool to provide said closed fuel tank output position, and a seal arranged between said spool and said valve assembly sealing said spool and said valve assembly in said closed fuel tank output position.

7. The thermal management system according to claim 1, wherein said oil cooler is an engine oil cooler, and wherein a generator oil cooler is fluidly connected to said spool valve with fuel flowing through said spool valve to said generator oil cooler in response to said spool valve being in a third position.

8. The thermal management system according to claim 1, wherein said plurality of fluid pressure sources includes a solenoid electrically connected to an electronic control selectively permitting flow of fuel from a regulated fuel pressure supply to said spool valve.

9. The thermal management system according to claim 1, wherein said plurality of fluid pressure sources includes a fuel metering valve selectively permitting flow of fuel from a regulated fuel pressure supply to said spool valve.

10. The thermal management system according to claim 1, wherein said plurality of fluid pressure sources includes a pressure regulating valve supplying a regulated fuel pressure supply to said spool valve.

11. The thermal management system according to claim 6, wherein said plurality of fluid pressure sources includes a fuel pump supplying fuel pressure to said valve assembly.

12. A spool valve for use in an aircraft fuel system comprising:

a housing having a bore with a plurality of pressure inputs and oil cooler and fuel tank outputs fluidly connected with said bore;

a spool disposed within said bore and movable axially relative thereto between open oil cooler, open fuel tank, and closed fuel tank output positions;

a valve assembly disposed within said bore and movable axially relative to said housing and said spool, said valve assembly coacting with said spool to provide said closed fuel tank output position;

a seal arranged between said spool and said valve assembly sealing said spool and said valve assembly in said closed fuel tank output position; and a sensor supported by said housing coacting with at least one of said spool and said valve assembly sensing said closed fuel tank output position.

13. The spool valve according to claim 12, wherein said valve assembly includes a piston coaxial with said spool and movable relative to said spool.

14. The spool valve according to claim 13, wherein said spool includes a longitudinal hole with a target piston disposed within said hole, and an end portion of said target piston secured to said piston for moving axially with said piston.

15. The spool valve according to claim 14, wherein said sensor is located proximate to said target piston for determining a location of said target piston indicative of said closed fuel tank output position.

16. The spool valve according to claim 14, wherein said plurality of input pressures act upon said spool, said piston, and said target piston moving at least one of said spool, said piston and said target piston under the force of said pressures to obtain said open oil cooler, said open fuel tank, and said closed fuel tank output positions.

17. The spool valve according to claim 12, wherein said housing includes a spool sleeve and a piston sleeve arranged proximate said spool sleeve with said spool and piston respectively disposed therein and movable axially relative thereto.

18. The spool valve according to claim 17, wherein a seal is arranged between said spool sleeve and said piston, said sleeve engaging said spool sleeve and said piston in said closed fuel tank output position, with said sensor determining whether said seal is engaging said spool sleeve and said piston based upon said target piston location.

19. The spool valve according to claim 12, wherein a second sensor is supported by said housing coacting with at least one of said spool and said valve assembly sensing said closed fuel tank output position.

20. The spool valve according to claim 12, wherein said sensor is a proximity sensor.

* * * * *